Patented Jan. 5, 1937

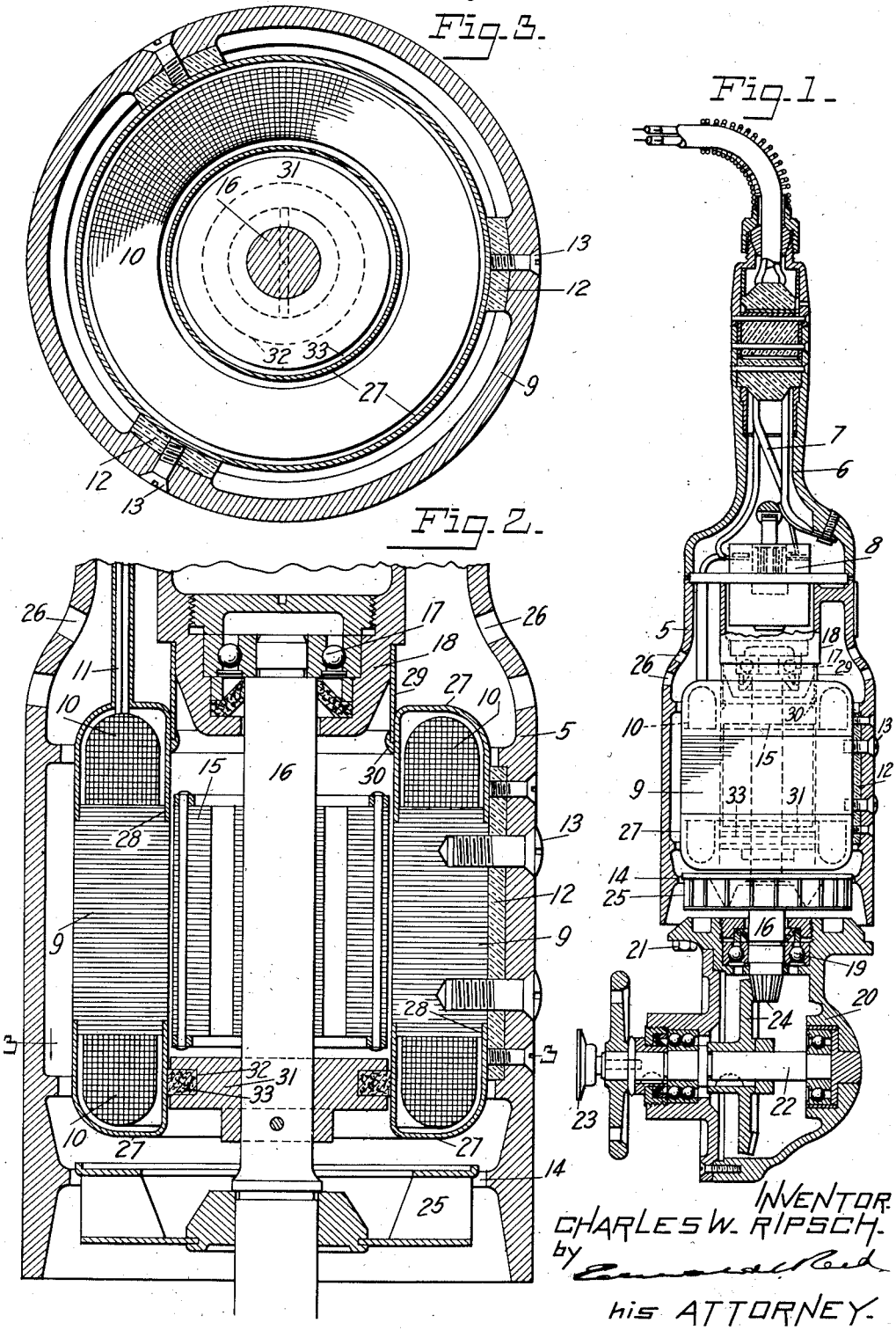

2,066,740

UNITED STATES PATENT OFFICE 2,066,740

ELECTRIC MOTOR

Charles W. Ripsch, Dayton, Ohio, assignor to The Buckeye Portable Tool Company, Dayton, Ohio, a corporation of Ohio Application May 9, 1935, Serial No. 20,642

7 Claims. (Cl. 172—36)

This invention relates to electric motors and more particularly to means for excluding dust and other matter from the motor.

Motors are frequently operated in places where dust, or other finely divided matter, is suspended in the atmosphere and is carried into the motor by the cooling air, and lodging therein often causes damage to the motor. For example, one type of electrically operated portable tool is used for polishing automobile bodies which have been coated with a lacquer and fine particles of lacquer and small bits of the polishing element will enter the motor and clog the air passageways, more particularly the air gap between the rotor and the stator, thus causing the excessive heating of the motor. The fine material thus drawn into the motor is inflammable and when it accumulates on the windings is liable to be ignited and to damage the windings.

It has been proposed heretofore to exclude dust from the motor by enclosing the motor in a dust proof housing but such devices have not been satisfactory. They prevent the proper circulation of air for cooling and add materially to the weight and size of the motor, which is highly objectionable in a portable tool which is supported by the operator while in use. Further, in the use of portable tools it is frequently necessary to remove the rotor or both the rotor and the stator and when the motor, or the rotor and the stator, are enclosed in a housing of the type heretofore employed it is necessary to dismantle the housing before removal can be effected.

One object of the invention is to provide a motor with means for excluding dust therefrom which will not prevent the circulation of air necessary to cool the motor, or interfere with the removal of the rotor or stator from the motor casing, and which will not increase the size of the motor and will add but little to its weight.

A further object of the invention is to provide dust excluding means which will be very simple in construction, which can be easily installed in the motor, and which can be manufactured at low cost.

Other objects of the invention will appear as the apparatus is described in detail.

In the accompanying drawing Fig. 1 is a longitudinal sectional view taken through an electrically operated portable tool embodying my invention; Fig. 2 is a longitudinal sectional view taken through the motor; and Fig. 3 is a transverse sectional view taken on the line 3—3 of Fig. 2.

In this drawing I have illustrated one embodiment of the invention and shown the same as applied to the motor of an electrically operated polishing tool but it will be understood that this particular embodiment has been chosen for the purposes of illustration only and that the invention may take various forms and may be applied to motors used for various purposes.

In the particular polishing tool here shown the motor is built into and forms a part of the tool itself. The motor casing, which is shown at 5, encloses the various motor elements and extends rearwardly therefrom, and detachably connected with the rear end of the motor casing is a hollow extension or handle portion 6 through which the conductors 7 extend to a terminal block 8. The stator comprises a laminated core 9 and windings 10 which project beyond each end of the core. Conductors 11 lead from the windings to the terminal block 8. The stator is spaced from the motor casing to provide passageways for the circulation of air and, in the present instance, this spacing is effected by interposing between the stator and the casing a series of heat insulating elements 12 which are spaced apart about the stator. The stator and insulating elements are rigidly secured one to the other and to the casing by screws 13 extending through the casing. By removing the screws 13 and disconnecting the conductors 11 from the terminal block the stator may be withdrawn through an opening 14 at the forward end of the housing. The rotor 15 is carried by a shaft 16, the rear end of which is mounted in a ball bearing 17 carried by a member 18 located centrally of the rear portion of the motor casing and rigidly connected therewith. The forward end of the rotor shaft is mounted in a bearing 19 which is removably attached to the forward end of the motor casing. In the present instance, it is carried by a housing 20 which is detachably secured to the motor casing by screws 21 and is spaced from the edge of the motor casing to provide an air passageway. A transverse shaft 22 mounted in the housing 20 is provided at its outer end with a polishing element 23 and is connected with a rotor shaft by gears 24. A fan 25 secured to the rotor shaft and mounted in the forward portion of the motor casing serves to draw air through inlets 26 in the rear portion of the motor casing, circulate the same about the stator and discharge the same through the open forward end of the casing. The rear end of the rotor shaft is removably mounted in the inner bearing ring and when the forward bearing has been detached from the motor casing the rotor and its shaft can be withdrawn axially from the motor casing. The tool which has been shown and described is of a well known type and forms no part of the present invention, except in so far as the elements thereof enter into combination with the novel elements which will now be described.

The stator windings 10, which project beyond the respective ends of the core 9 are enclosed in separate housings which are so constructed and mounted as to effectually exclude dust from contact with the windings but do not interfere with the circulation of air and are removable with the stator through the opening 14 at the forward end of the casing. The housings are annular in form and substantially U-shaped in cross section, as shown at 27, and have their edges mounted in circumferential recesses 28 formed in the respective sides of the core 9. The housings are preferably formed of resilient metal and when the edges have been sprung into the recesses the housings will be firmly retained on and supported by the stator. It will be noted that the outer diameter of each housing is approximately equal to the diameter of the core so that the lateral walls of the housings are substantially flush with the circumferential surface of the core.

To prevent air and dust from passing about the housing 27 at the rear end of the stator and thus coming in contact with the rotor and entering the space between the rotor and the stator, I have interposed between that housing and the centrally arranged bearing supporting member 18 an annular member 29 which has sealing contact both with the housing and with the central member. In the present construction, this annular member is in the form of a sleeve, one end of which overlaps a cylindrical portion of the member 18 and the other end of which fits snugly within the central opening of the annular housing. This annular member or sleeve 29 is secured to one of the parts with which it contacts but is separably connected with the other part so that it can be disconnected therefrom when the stator and housing 27 are withdrawn from the motor casing. In the present instance, the sleeve is rigidly secured to the inner wall of the housing, as by brazing, as shown at 30, and has a snug sliding fit about the central member 18. Thus the space between the rear housing and the central member 18 is completely closed and dust excluded from the interior of the stator without in any way interfering with the removal of the stator, and the air circulating about the housings 27 and the stator core will serve to effectively cool the same.

While the cooling air is drawn through the passageways and discharged at the forward end of the motor casing some air and dust may be carried back into the stator from the forward end of the casing, due to eddy currents or the like, and it is therefore also desirable to provide a closure for the central opening in the annular housing at the forward end of the motor. Preferably this closure is mounted on the rotor shaft for rotation therewith and arranged in sealing contact with the forward housing 27, thus enabling it to be withdrawn with the rotor. The closure may take various forms but, as here shown, it comprises a plate 31 rigidly secured to the shaft 16 and arranged within the central opening of the housing to contact with the inner wall thereof. In the present construction the plate is provided with a circumferential groove 32 in which is mounted a suitable packing 33 which engages the wall of the housing, the plate itself being of a diameter slightly less than the diameter of the central opening of the housing. By spacing the closure plate rearwardly from the front end of the housing 27 a larger portion of that housing is exposed to the action of the air and a more effective cooling is secured.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a motor including a casing, a stator mounted in said casing and comprising a core and windings projecting beyond the ends of said core, a rotor and a shaft for said rotor, separate annular housings mounted about and enclosing the windings at the respective ends of said stator and each having parts supported on said core on opposite sides of said windings, and means cooperating with said housings to prevent the entrance of dust between said stator and said rotor.

2. In a motor including a casing having at one end thereof a centrally arranged member, a bearing carried by said member and adapted to receive one end of a rotor shaft, a stator comprising a core and windings projecting beyond the ends of said core, said stator and said casing being arranged to provide air passageways between them and said casing having air inlets beyond that end of said stator adjacent to said central member, annular housings substantially U-shaped in cross section mounted about and enclosing the windings at the respective ends of said stator, and means for closing the space between said central member and the adjacent housing and maintaining open communication between said air inlets and said air passageways.

3. In a motor including a casing having at one end thereof a centrally arranged member, a bearing carried by said member and adapted to receive one end of a rotor shaft, and a stator comprising a core and windings projecting beyond the ends of said core, said stator being removable through one end of the motor casing, annular housings substantially U-shaped in cross section mounted about and enclosing the windings at the respective ends of said stator, each housing being connected with said stator and being removable with said stator when the latter is withdrawn from the motor casing, said stator and its housings being spaced from the surrounding wall of said casing to provide air passageways, said casing having air inlets beyond that end of the stator adjacent to said central opening, and an annular member arranged between and contacting with said central member and the adjacent housing, said annular member being secured to one of said parts and being separable from the other of said parts to permit the housing to be withdrawn from said stator.

4. In a motor including a casing having at one end thereof a centrally arranged member, a bearing carried by said member, a stator comprising a core and windings projecting beyond the ends of said core, a rotor and a shaft for said rotor mounted at one end in said bearing, said stator being removable through one end of said motor casing, annular housings substantially U-shaped in cross section mounted about and enclosing the windings at the respective ends of said stator, each housing being connected with said stator for removal therewith and said stator and its housings being spaced from the surrounding wall of said casing to provide air passageways and said casing having air inlets beyond that end of said stator adjacent to said central member, means for closing the space between said central member and the adjacent housing, and means carried by the rotor shaft for closing the central opening through the other housing.

5. In a motor including a casing having at one end thereof a centrally arranged member, a bearing carried by said member, a stator comprising a core and windings projecting beyond the ends of said core, a rotor and a shaft for said rotor mounted at one end in said bearing, said stator being removable through one end of said motor casing, annular housings substantially U-shaped in cross section mounted about and enclosing the windings at the respective ends of said stator, each housing being connected with said stator for removal therewith and said stator and its housings being spaced from the surrounding wall of said casing to provide air passageways and said casing having air inlets beyond that end of said stator adjacent to said central member, an annular member extending between and contacting with said central member and the adjacent housing, said member being separable from one of said parts by the withdrawal of said stator, and a closure element carried by said rotor shaft, contacting with the other housing to close the central opening therethrough and removable from said housing with said shaft when said rotor is withdrawn from said stator.

6. In a motor including a casing, a stator mounted in said casing and comprising a core and windings projecting beyond the ends of said core, a rotor and a shaft for said rotor, separate annular housings substantially U-shaped in cross section mounted about and enclosing the windings at the respective ends of said support, each housing having both edges supported on said stator core on opposite sides of said windings, and a circular member mounted in the central opening of one of said annular housings, secured to said rotor shaft and having rotative contact with the inner wall of said housing.

7. In a motor including a casing having at one end thereof a centrally arranged member, a bearing carried by said member, a stator mounted in said casing and removable through one end thereof, said stator comprising a core and windings projecting beyond the ends of said core, a rotor mounted in said stator and removable lengthwise therefrom, a shaft for said rotor having one end removably mounted in said bearing, and a removable bearing for the other end of said shaft, separate annular housings substantially U-shaped in cross section mounted about and enclosing the windings at the respective ends of said stator, each housing being connected with said stator for removal therewith when said stator is withdrawn from said casing, a sealing member secured to one of said housings and having frictional connection with said central member, and means secured to said rotor shaft for rotation therewith, having sealed contact with the inner wall of the other housing and removable from said other housing with said rotor when the latter is withdrawn from said stator.

CHARLES W. RIPSCH.